Feb. 27, 1923.
G. E. VATTER
1,446,488
AUTOMOBILE AMBULANCE
Filed Oct. 29, 1921
2 sheets-sheet 1
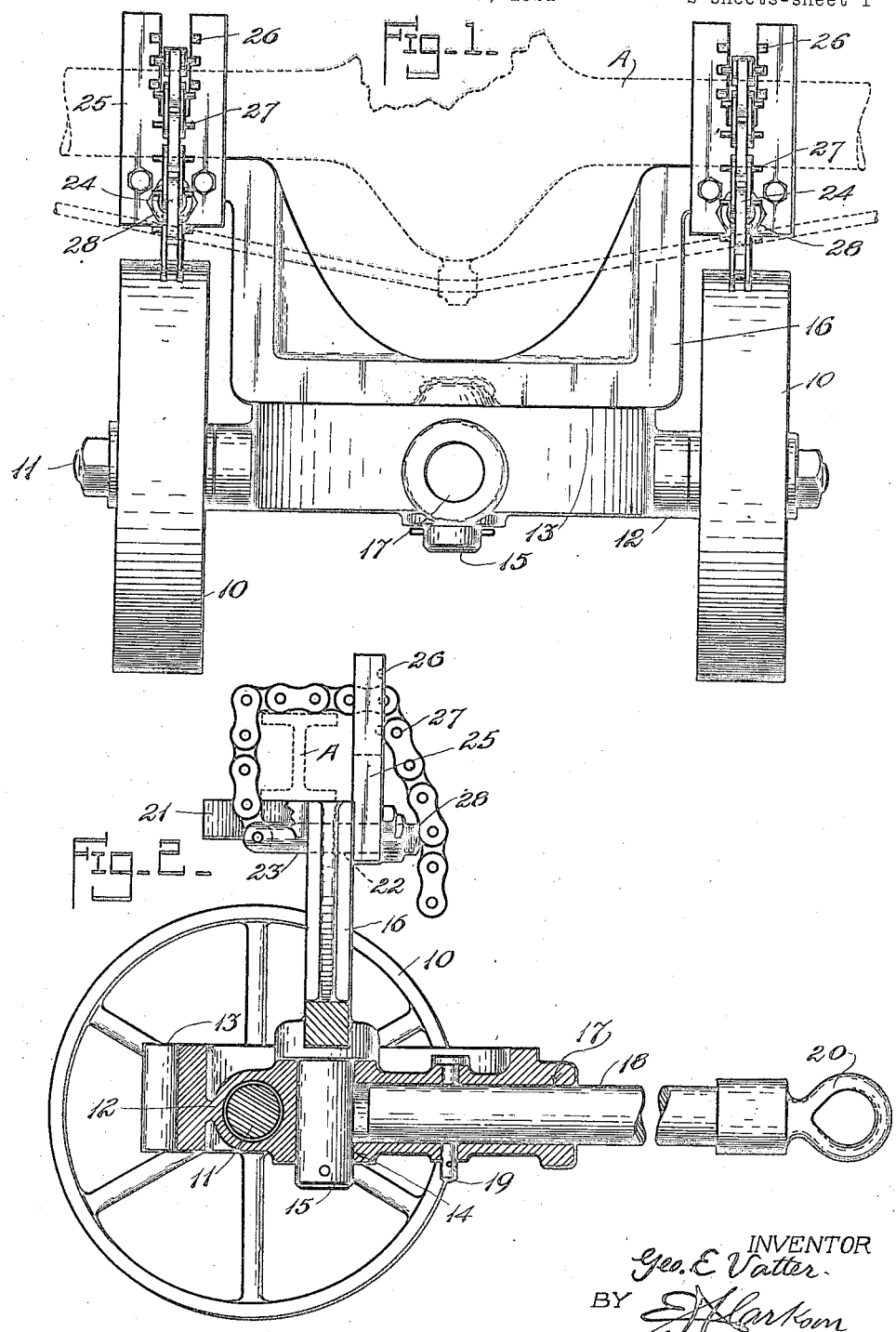
INVENTOR
Geo. E. Vatter
BY
ATTORNEY

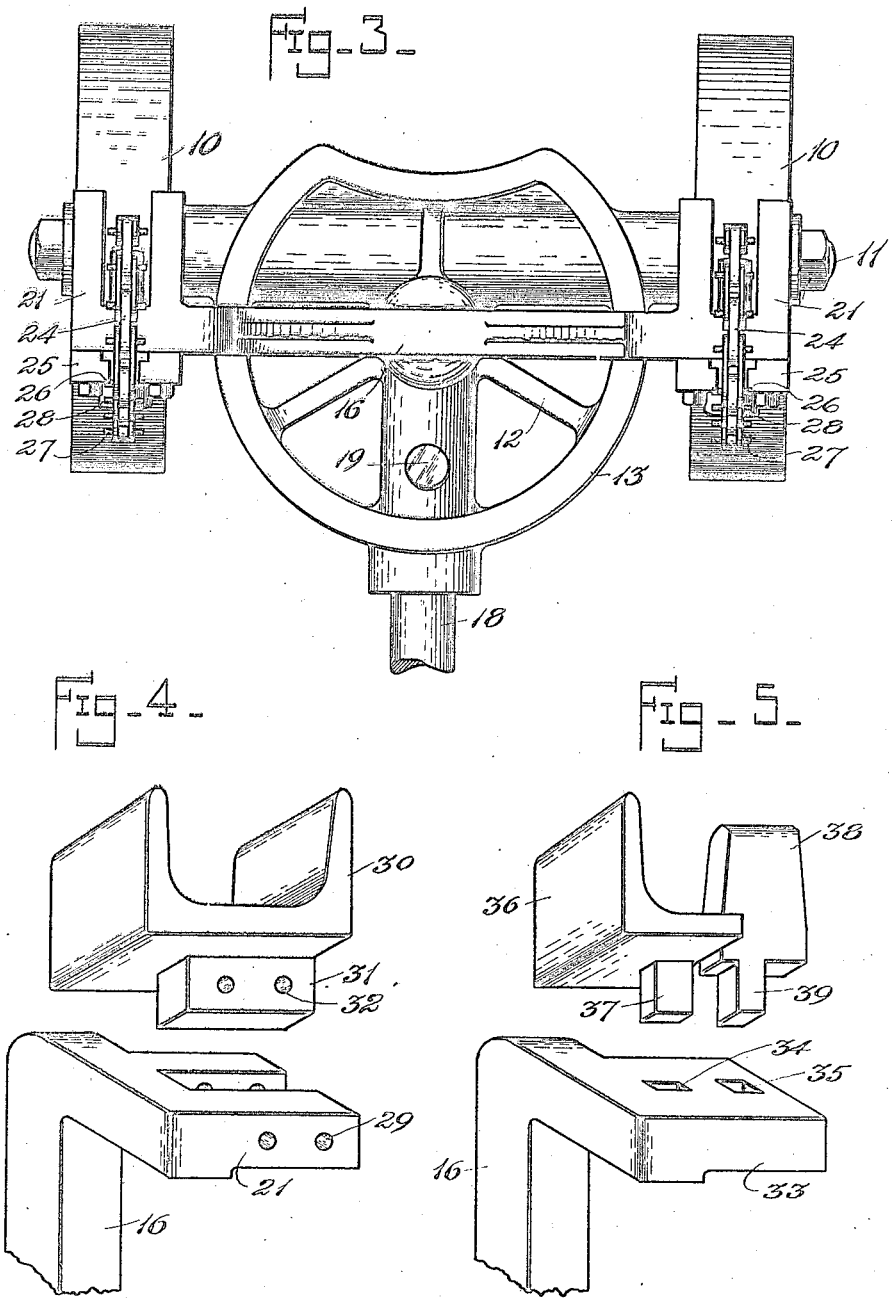

Patented Feb. 27, 1923.

1,446,488

UNITED STATES PATENT OFFICE.

GEORGE EDWARD VATTER, OF LOUISVILLE, KENTUCKY.

AUTOMOBILE AMBULANCE.

Application filed October 29, 1921. Serial No. 511,816.

*To all whom it may concern:*

Be it known that GEORGE EDWARD VATTER, a citizen of the United States, residing at Louisville, in the county of Jefferson and State of Kentucky, has invented certain new and useful Improvements in Automobile Ambulances, of which the following is a specification.

This invention relates to vehicles and has special reference to a wheeled truck or bogie for use in supporting broken-down automobiles so that they may be rolled from place to place, the invention being preferably termed by me an automobile ambulance.

One important object of the invention is to improve and simplify the general construction of devices of this character.

A second important object of the invention is to provide an improved arrangement for securely gripping the axle of the broken-down automobile.

A third important object of the invention is to provide a truck of this character wherein clips or forks of various sizes may be used to engage the different sizes of automobile axles.

A fourth important object of the invention is to provide an improved and novel form of adjustable clips for this purpose.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is an elevation of the device showing the same applied to the rear axle of an automobile with the tongue element and the pin removed.

Figure 2 is a central longitudinal section therethrough.

Figure 3 is a plan view thereof.

Figure 4 is a perspective view showing the manner of utilizing clips or forks of different sizes to accommodate different sized automobile axles without the necessity of using a clamping chain.

Figure 5 is a view similar to Figure 4 showing an improved form of clip or fork which may be adjusted readily for three different sized axles.

In the embodiment of the invention herein illustrated there is provided a pair of spaced wheels 10 which are carried on a main axle 11 extending transversely through a frame 12 which is of arcuate shape in plan so as to provide a supporting ring 13. This frame is provided centrally of the supporting ring with a socket 14 wherein is revolubly mounted the center pin 15 of a yoke 16 which is so shaped that the outer end portions of this yoke member are supported on the ring 13. In this manner the frame can be rotated with respect to the yoke member. This frame is also provided with a socket 17 wherein is fitted a bar 18 which is held in the socket by a pin 19. This bar 18 is provided at its extremity with an eye 20 so that it may be secured to a towing automobile. Extending rearwardly from the upper ends of the yoke member 16 are forks 21 and each arm of the yoke is provided with a suitable opening centrally of each of the forks 21 in plan as shown at 22. Through each of the openings 22 extends an adjusting bolt 23 which has pivotally connected to one end a clamping chain 24. Secured to the forward side of each fork 21 is a fork plate 25 and this fork plate is provided on its forward side with spaced notches 26 to receive the pivot pin ends 27 of the chain 24, the space between the arms of the fork 25 being just sufficient to permit passage of the body of this chain but being too narrow to permit passage of the pin ends 27. The position of the bolt 23 may be adjusted by means of a nut 28.

In utilizing the device in this form the forks 21 are positioned beneath an axle A of the automobile, the latter having been raised by a suitable jack to permit this arrangement. The nut 28 is then loosened until the bolt 23 extends well through the yoke whereupon the chain is brought over and the ends 27 of one of the pins engage in suitable notches 26. The nut 28 is then tightened and this tightens the chain so that it grips firmly around the axle. The bar 18 may then be used, either by hand, or by connection to another automobile, to move the broken-down end of the vehicle, the other end rolling on its own wheels or on a second similar truck. It is obvious that the pivot 15 permits angular positioning of the wheels 10 with reference to the yoke so that the vehicle being moved may be taken around corners.

In addition to the provision of the chain 24, and for use in cases where it is not necessary to use this chain, the forks 21 are provided with bolt receiving openings 29 and similar shaped clips or forks 30 are provided of suitable size to fit the particular axle in the broken-down machine. Each of these clips is provided with a lug 31 having bolt receiving openings 32, the lug being a proper size to fit between the arms of the forks 21 with the openings 29 and 32 in alinement so that bolts or pins can be passed through these openings and hold the clip or fork in position.

In the modification shown in Figure 5 the forks 21 are dispensed with and in place of these forks there is provided a pair of rearwardly extending lugs 33 having vertical sockets 34 and 35 extending therethrough. In place of the similar shaped clip 30 an L-shaped member 36 is provided which has a lug 37 in its bottom fitting within the socket 34. In order to close the open side of this L-shaped member a post 38 is provided and has a lug 39 projecting downwardly from its lower side and of proper size and shape to fit the socket 38. This lug 39 is square and the socket 35 is of the same cross section. Moreover the lug 39 is positioned off-center of the post 38 so that by turning this post end for end or sideways three different widths of clip are obtained.

In use with the form shown in Figures 4 and 5 the operation is merely that of engaging the axle of the broken-down machine in the clips of these forms, the chain being unnecessary in this case.

It will be observed that the fork 21 and also the part 33 will slide under the rear axle and above the truss rod in applying the device. In other words these parts go between the rear axle housing and the truss rod and fits so that there is a clearance between the truss rod and the yoke 16. This eliminates the loss of time in using devices which require the removal of the truss rod, this removal requiring in many instances, the removal of one of the rear wheels to get at the truss rod nut. These advantages are due to the proportions of the fork 21 and the yoke 16 which are sufficient to enable the truss rod to be cleared and yet leave enough strength in the material to carry the car even with an axle housing ten inches in diameter. The same fork 21 also will take care of the front axle in cases in which the dust or wind shield extends down against the axle. In this event the yoke 16 is turned around which brings the fork into position behind the axle thus clearing the mud shield. At the same time this position allows the chain to pass between the axle and mud shield.

There has thus been provided a simple and efficient device of the kind described and for the purpose specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention, what is claimed as new, is:—

1. In a device of the kind described, a wheel supported frame, a yoke pivotally mounted on said frame, forks projecting upwardly from the arms of said yoke, chains adapted to fit in and be held by the respective forks, said forks having their arms arranged to engage the sides of the chain and hold it releasably in adjusted position, and a connection between the ends of each chain and the yoke.

2. In a device of the kind described, a wheel supported frame, a yoke pivotally mounted on said frame, forks projecting upwardly from the arms of said yoke, chains adapted to fit in and be held by the respective forks, and a connection between the ends of each chain and the yoke comprising a bolt passing through the yoke and slidable therein, and a nut screwed on the bolt to draw it forcibly through the yoke.

3. In a device of the kind described, a wheel supported frame, a yoke pivotally mounted on said frame, forks projecting upwardly from said frame and each having notches arranged in series opposite each other on the inner edge portions of the faces of the yoke arms, chains movable between the arms of the respective forks and having pivot pins projecting over the arms and receivable in the notches, and a connection between the end of the chain and the yoke.

4. In a device of the kind described, a wheel supported frame, a yoke pivotally mounted on said frame, forks projecting upwardly from said frame and each having notches arranged in series opposite each other on the inner edge portions of the faces of the yoke arms, chains movable between the arms of the respective forks and having pivot pins projecting over the arms and receivable in the notches, and a connection between the end of the chain and the yoke comprising a bolt passing through the yoke and slidable therein, and a nut screwed on the bolt to draw it forcibly through the yoke.

5. In a device of the kind described, a wheel supported frame, a yoke carried on the frame and having spaced arms each provided with a lug having a plurality of apertures angular in cross section, an L-shaped member having a lug on one portion fitting one of the apertures, and a post of oblong cross section and having a lug arranged to fit the other aperture in varying positions of the post, said lug being eccentrically disposed on the face of the post.

In testimony whereof I affix my signature.

GEORGE EDWARD VATTER.